United States Patent
Magill et al.

(10) Patent No.: US 6,915,372 B2
(45) Date of Patent: Jul. 5, 2005

(54) METHODS AND APPARATUS FOR MANAGING TRAFFIC THROUGH A BUFFERED CROSSBAR SWITCH FABRIC

(75) Inventors: Robert B. Magill, Mishawaka, IN (US); Terry J. Hrabik, South Bend, IN (US); Tara Javidi, Ann Arbor, MI (US)

(73) Assignee: Tellabs Operations, Inc., Naperville, IL (US)

( * ) Notice: Subject to any disclaimer, the term of this patent is extended or adjusted under 35 U.S.C. 154(b) by 450 days.

(21) Appl. No.: 09/877,502

(22) Filed: Jun. 8, 2001

(65) Prior Publication Data

US 2002/0044546 A1 Apr. 18, 2002

Related U.S. Application Data

(60) Provisional application No. 60/230,563, filed on Aug. 31, 2000.

(51) Int. Cl.[7] ............................................... G06F 13/00
(52) U.S. Cl. ........................................... 710/317; 710/56
(58) Field of Search ................................. 710/316–317, 710/53, 56–57, 112; 370/230, 231, 236, 413, 461, 235, 351, 357, 395.1, 395.4, 395.41, 395.42, 412, 414

(56) References Cited

U.S. PATENT DOCUMENTS

| | | | | |
|---|---|---|---|---|
| 5,418,967 A | * | 5/1995 | Simcoe et al. | 710/241 |
| 5,467,347 A | * | 11/1995 | Petersen | 370/230 |
| 5,923,656 A | * | 7/1999 | Duan et al. | 370/395.4 |
| 6,351,466 B1 | * | 2/2002 | Prabhakar et al. | 370/413 |
| 6,359,861 B1 | * | 3/2002 | Sui et al. | 370/230 |
| 6,449,283 B1 | * | 9/2002 | Chao et al. | 370/461 |
| 6,563,837 B2 | * | 5/2003 | Krishna et al. | 370/413 |
| 6,570,850 B1 | * | 5/2003 | Gutierrez et al. | 370/231 |
| 6,629,147 B1 | * | 9/2003 | Grow | 709/236 |
| 6,667,984 B1 | * | 12/2003 | Chao et al. | 370/414 |

FOREIGN PATENT DOCUMENTS

| JP | 02000151624 A | * | 5/2000 | H04L/12/28 |
|---|---|---|---|---|
| JP | 02000349762 A | * | 12/2000 | H04L/12/28 |

OTHER PUBLICATIONS

Oki et al., "Scalable Crosspoint Buffering ATM Switch Architecture Using Distributed Arbitration Scheme", IEEE, 1997, pp. 28–35.*

Mekkitikul et al., "A Practical Scheduling Algorithm to Achieve 100% Throughput in Input–Queued Switches" IEEE, 1998, p. 792–799.*

McKeown, "The iSLIP Scheduling Algorithm for Input–Queued Switches", IEEE, 1999, pp. 188–201.*

Rojas–Cessa et al. "CIXB–1: Combined Input–One–cell–Crosspoint Buffered Switch", IEEE, 2001, pp. 324–329.*

* cited by examiner

Primary Examiner—Paul R. Myers
(74) Attorney, Agent, or Firm—Lawrence M. Cho

(57) ABSTRACT

A data routing mechanism is disclosed. The data routing mechanism includes virtual output queues (VOQs), corresponding to a first input port, that store data to be sent to one of a first and second output port. The data routing mechanism includes VOQs, corresponding to a second input port, that store data to be sent to one of the first and second output port. The data routing mechanism includes a switch fabric that includes a plurality of buffers at crosspoints between the first and second input ports and the first and second output ports. The data routing mechanism includes a first input scheduler that transmits a first data from the VOQs corresponding to the first input port to one of the plurality of buffers based on lengths of the VOQs corresponding to the first input port and a credit state of the plurality of buffers.

20 Claims, 13 Drawing Sheets

METHODS AND APPARATUS FOR MANAGING TRAFFIC THROUGH A BUFFERED CROSSBAR SWITCH FABRIC

RELATED APPLICATIONS

This patent application claims the priority date of the provisional patent application having the assigned Ser. No. 60/230,563 filed on Aug. 31, 2000.

FIELD OF THE INVENTION

The present invention relates to data networks. More specifically, the present invention relates to mechanisms for routing and scheduling data through a data network.

BACKGROUND OF THE INVENTION

A crossbar switch fabric provides a network of paths between input ports and output ports. With every cycle, a scheduler of the crossbar switch fabric considers the traffic presented by the input side of the switch, and makes a set of connections from the crossbar switch fabric's inputs to its outputs. Typically, a crossbar switch fabric includes an array of $N^2$ individually operated crosspoints where N is the number of inputs and outputs. Each crosspoint has a possibility of entering into two states, a cross and a bar. A connection between an input port i and an output port j is established by setting the $(i,j)^{th}$ crosspoint switch to a cross state. The scheduler controls the crosspoints. The scheduler considers all packets to be transferred across the crossbar switch fabric and selects a configuration, ensuring that any one instance, each input is connected to at most one output and that each output is connected to at most one input.

Unlike shared buses or shared memory, a crossbar switch fabric connects input and output ports over a dedicated link. Multiple dedicated links can operate at lower speeds than one shared medium, giving crossbar switch fabrics an advantage over other types of switch fabrics from a scalability and cost perspective.

Crossbar fabrics can suffer some performance drawbacks however. With random traffic distributions and multiple inputs, there can be contention for any one of the output ports on the crossbar fabric. When schedulers at multiple input ports attempt to send traffic through one of the output ports at the same time, other traffic at the input ports may become stalled. Thus, what is needed is a mechanism for routing and scheduling traffic through a network that is efficient and cost effective.

SUMMARY OF THE INVENTION

A data routing mechanism according to a first embodiment of the present invention is disclosed. The data routing mechanism includes virtual output queues (VOQs), corresponding to a first input port, that store data to be sent to one of a first and second output port. The data routing mechanism includes VOQs, corresponding to a second input port, that store data to be sent to one of the first and second output port. The data routing mechanism includes a switch fabric that includes a plurality of buffers at crosspoints between the first and second input ports and the first and second output ports. The data routing mechanism includes a first input scheduler that transmits a first data from the VOQs corresponding to the first input port to one of the plurality of buffers based on lengths of the VOQs corresponding to the first input port and a credit state of the plurality of buffers.

A data routing mechanism according to a second embodiment of the present invention is disclosed. The data routing mechanism includes a first virtual output queue (VOQ), corresponding to a first input port, that stores a cell to be sent to a first output port. The data routing mechanism includes a second VOQ, corresponding to the first input port, that stores a cell to be sent to a second output port. The data routing mechanism includes a first VOQ, corresponding to a second input port, that stores a cell to be sent to the first output port. The data routing mechanism includes a second VOQ, corresponding to the second input port, that stores a cell to be sent to the second output port. The data routing mechanism includes a first buffer at a crosspoint between the first input port and the first output port. The data routing mechanism includes a second buffer at a crosspoint between the first input port and the second output port. The data routing mechanism includes a third buffer at a crosspoint between the second input port and the first output port. The data routing mechanism includes a fourth buffer at a crosspoint between the second input port and the second output port. The data routing mechanism includes a first input scheduler that transmits the cell in one of the first and second VOQs corresponding to the first input port to one of the first and second buffers based on lengths of the first and second VOQs corresponding to the first input port and whether the first and second buffers may receive the first data.

A method for managing traffic in a switch fabric according to an embodiment of the present invention is disclosed. Queue lengths for virtual output queues (VOQs) corresponding to a first input port are identified. Buffers at crosspoints associate with the VOQs corresponding to the first input port that may be occupied are identified. A cell in a VOQ corresponding to the first input port with a relatively longest queue length and that is associated with a crosspoint having a buffer that may be occupied is transmitted to the buffer.

BRIEF DESCRIPTION OF THE DRAWINGS

The features and advantages of the present invention are illustrated by way of example and are by no means intended to limit the scope of the present invention to the particular embodiments shown, and in which.

DETAILED DESCRIPTION

In the following description, for purposes of explanation, specific nomenclature is set forth to provide a thorough understanding of the present invention. However, it will be apparent to one skilled in the art that these specific details may not be required to practice the present invention. In other instances, well known circuits and devices are shown in block diagram form to avoid obscuring the present invention unnecessarily. Additionally, the interconnection between circuit elements or blocks may be shown as buses or as single signal lines. Each of the buses may alternatively be single signal lines, and each of the single signal lines may alternatively be buses.

Figure 1:
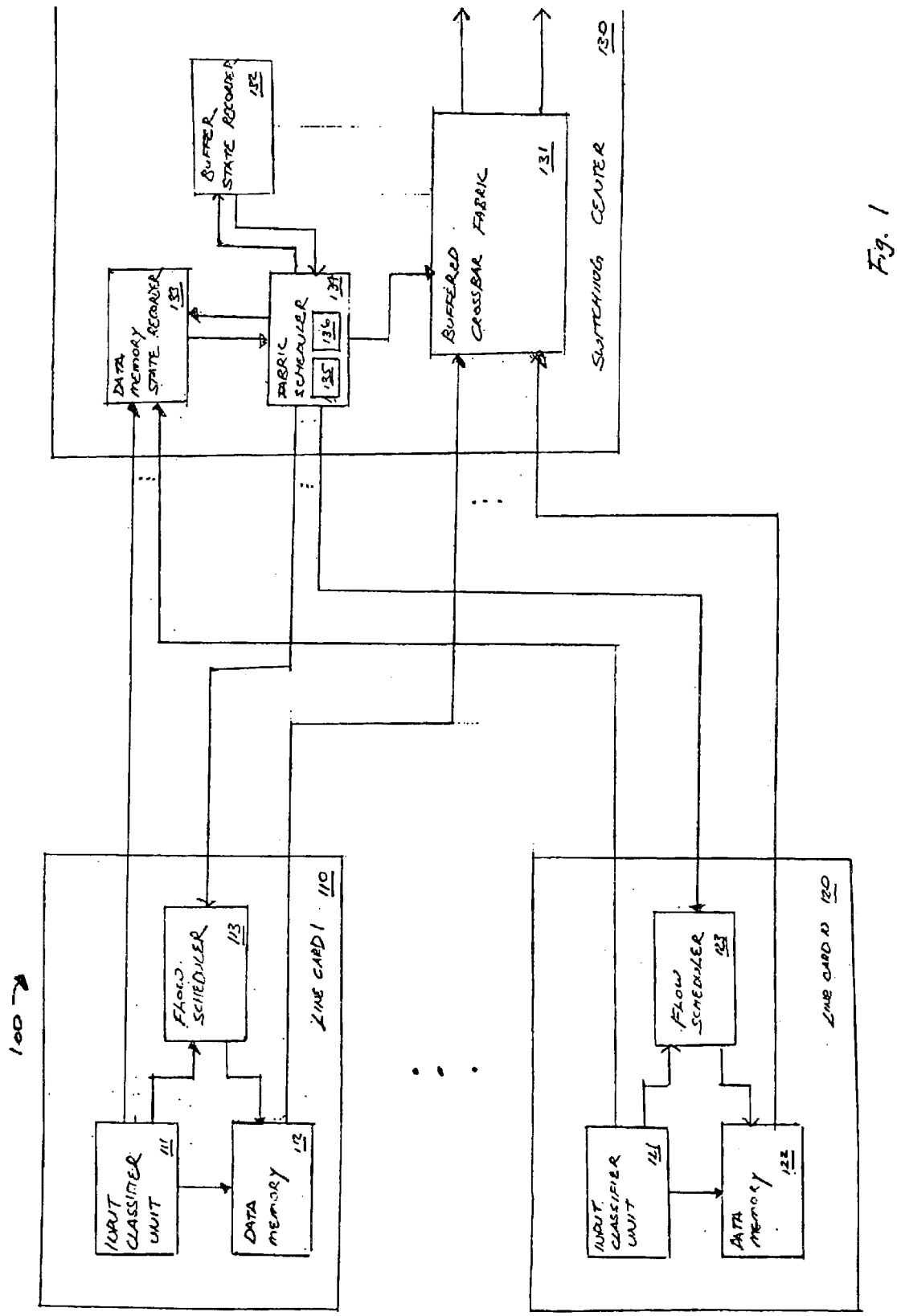
FIG. 1 is a block diagram illustrating a network switch according to an embodiment of the present invention.

FIG. 1 is a block diagram illustrating a switch 100 according to an embodiment of the present invention. The switch 100 includes a plurality of line cards. Block 110 represents a first line card and block 120 represents an Nth line card 120 where N can be any number. Each of the line cards may receive data cells from external locations. The line cards direct the data cells into a switching center 130 of the switch 100 for re-routing to an external location. According to an embodiment of the present invention, the switching center 130 is at a centralized location in the switch 100. Each line card has a corresponding input port that connects it to the switching center 130. The switching center 130 re-routes a data cell through one of a plurality of output ports according to a destination intended for the data.

Line card 110 includes an input classifier unit 111. The input classifier unit 111 receives data cells with control information. The control information may, for example, reside in a header of the data cells. The control information may include address information that indicates a destination of the data cell. The control information may also include priority information that may be used to prioritize a first data cell relative to other data cells. The input classifier unit 111 associates an output port connected to the switching center 130 with the address information. The input classifier unit 111 classifies a data cell received according to the output port associated with the destination of the data cell.

Figure 2:
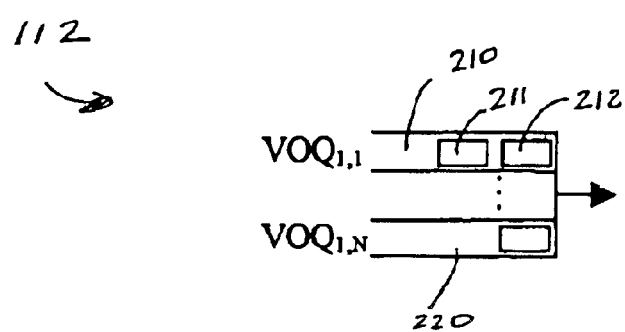
FIG. 2 illustrates an embodiment of the data memory shown in the network switch of FIG. 1.

Line card 110 includes a data memory 112. The data memory 112 includes a plurality of storage elements. The storage elements are logically divided into separate queues, one for each output port connected to the scheduling center 130. The queues are referred to as virtual output queues. Each of the virtual output queues store data cells to be routed to one of the output ports connected to the switching center 130. FIG. 2 illustrates one embodiment of the data memory 112 according to the present invention. The data memory 112 includes storage elements implemented as virtual output queues. Each virtual output queue is given a subscript designation i,j where i indicates the input port that corresponds to the line card of the virtual output queue and j indicates the output port where the data stored in the virtual output queue is to be transmitted to. A first virtual output queue 210 may be implemented for storing a plurality of data that is to be routed to a first output port. An Nth virtual output queue 220 may be implemented for storing a plurality of data that is to be routed to an Nth output port. As shown in this example, the first virtual output queue 210 stores a first data cell 211 and a second data cell 212 to be routed to a first output port. The first data cell 211 may have arrived at the first line card 110 at time x, and have a priority level marked low. The second data cell 212 may have arrived at the first line card 110 at time x+1, and have a priority level marked high.

Referring back to FIG. 1, line card 110 includes a flow scheduler 113. The flow scheduler 113 receives information about the data cells stored in each of the virtual output queues in the data memory 112. Upon receiving a control signal from the switching center 130 to send data from one of the virtual output queues into the switching center 130, the flow scheduler 113 selects one of the data cells stored in the virtual output queue. According to an embodiment of the switch 100, upon receiving a control signal to send a data cell from a virtual output queue to the switching center 130, the flow scheduler 113 selects a data cell based upon the priority of the data cell. According to an alternate embodiment of the switch 100, the flow scheduler 113 selects a data cell based upon the arrival time of the data cell. It should be appreciated that the flow scheduler 113 may select a data cell to be sent to the switching center 130 based upon other criteria of the data and the network.

It should be appreciated that the input classifier router 111, data memory 112, and flow scheduler 113 may be implemented using any known circuitry or technique. According to an embodiment of the present invention, the input classifier router, data memory 112, and flow scheduler 113 all reside on a single semiconductor substrate. Line card 120 may be configured similarly to line card 110. Line card 120 may include an input classifier unit 121, a data memory 122, and a flow scheduler 123 that operate similarly to the input classifier unit 111, data memory 112, and flow scheduler 113.

Block 130 represents a switching center 130. The switching center 130 schedules the transmission of data cells from the line cards 110 and 120 and re-routes the data cells to an output port corresponding to a destination of the data. The switching center 130 includes a buffered crossbar fabric 131. The buffered crossbar fabric 131 is coupled to a plurality of input ports and output ports. Each of the input ports is coupled to one of the line cards in the switch 100. Each of the output ports routes data cells from the buffered crossbar fabric 131 to an external destination. The buffered crossbar fabric 131 includes a plurality of crosspoints. The buffered crossbar fabric 131 provides a network of paths between input ports and output ports via the plurality of crosspoints. Each crosspoint may enter into one of two states, a cross state and bar state. A connection between an input port and an output port is established by setting the crosspoint switch to a cross state. Each crosspoint in the buffered crossbar fabric 131 has a buffer. According to an embodiment of the buffered crossbar fabric 131, the buffer is configurable to hold at least one data cell.

Figure 3:
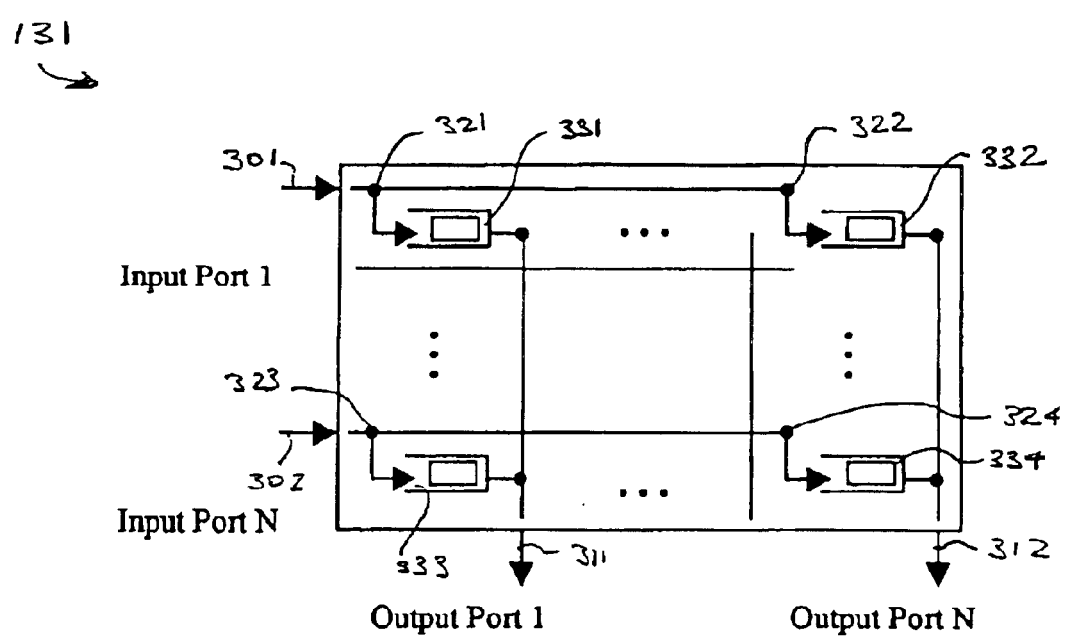
FIG. 3 illustrates an embodiment of the buffered crossbar fabric shown in the network switch of FIG. 1.

FIG. 3 illustrates an embodiment of the buffered crossbar fabric 131 of the switch 100 shown in FIG. 1. The buffered crossbar fabric 131 is connected to a plurality of input ports and output ports. Input port 301 is connected to the first line card 110 (shown in FIG. 1). Input port 302 is connected to the second line card 120 (shown in FIG. 1). The buffered crossbar fabric 131 is connected to output ports 311 and 312. Crosspoints 321–324 provide a path between input ports and output ports. Each of the crosspoints 321–324 includes a buffer 331–334, respectively. Each of the buffers 331–334 may store a cell of data received from one of the line cards. When data is transmitted to a crosspoint, the data is stored at the buffer of the crosspoint before it is transmitted to the output port.

Referring back to FIG. 1, the switching center 130 includes a buffer state recorder 132. The buffer state recorder 132 stores information about the buffers of the buffered crossbar fabric 131 regarding whether a buffer is full or whether a buffer is empty. According to an embodiment of the switch 100, the buffer state recorder 132 keeps track of a credit state of each buffer. In an embodiment of the buffered crossbar fabric 131 where each buffer stores only one data cell, the buffer state recorder 132 may track the credit state of each buffer. If a buffer is occupied or "non-empty", the credit state is 1. If the buffer is vacant or "empty", the credit state is 0.

The switching center 130 includes a data memory state recorder 133. The data memory state recorder 133 receives information from the input classifier unit 111 regarding which output port a newly arrived data cell is to be transmitted to. The data memory state recorder 133 records the number of data cells stored in each storage element in the data memory and thus keeps track of the queue lengths of each virtual output queue.

The switching center 130 includes a fabric scheduler 134. The fabric scheduler 134 includes an input scheduler 135. The input scheduler 135 includes an input scheduling unit (not shown) for each of the line cards in the switch 100. The input scheduling unit selects a virtual output queue in the data memory of its corresponding line card from which to transmit a data cell into the buffered crossbar fabric 131. According to an embodiment of the fabric scheduler 133, each input scheduling unit receives information from the data memory state recorder 133 that indicates the queue length of the virtual output queues in the data memory. The input scheduling unit also receives information from the buffer state recorder 132 that indicates whether a crosspoint associated with an output port corresponding to the virtual output queue is available to receive the data cell. According to an embodiment of the input scheduler 135, the input scheduling units choose the virtual output queues having the longest queue lengths with associated crosspoints available to receive data cells and send control signals to the flow scheduler 113 that prompt the data memory 112 to transmit data cells from the chosen virtual output queues.

The fabric scheduler 134 includes an output scheduler 136. The output scheduler includes an output scheduling unit (not shown) for each of the output ports in the buffered crossbar fabric 131. Each output scheduling unit selects a buffer at an associated crosspoint to transmit a data cell to its corresponding output port. The output scheduling unit receives information from the buffer state recorder 132 that indicates whether a data cell is available at the crosspoint buffer to transmit to the output port. According to an embodiment of the output scheduler 136, the output scheduling unit transmits data from the data occupied buffers using a round-robin schedule. According to an alternate embodiment of the fabric scheduler 136, the output scheduling unit also receives information from the data memory state recorder 132 that indicates which buffer has a corresponding virtual output queue with the longest queue length. In this embodiment, the output scheduling unit transmits data from the data occupied buffers using a longest queue first scheduling scheme.

Figure 4:
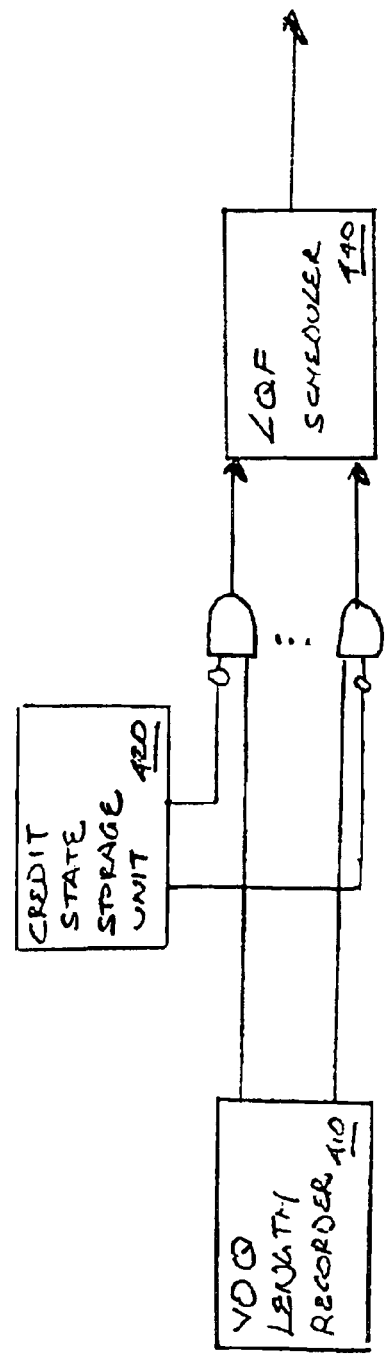
FIG. 4 illustrates an embodiment of the input scheduling unit which is part of the fabric scheduler shown in the network switch of FIG. 1.

FIG. 4 illustrates an embodiment of an input scheduling unit 400 according to an embodiment of the present invention. The input scheduling unit 400 includes a virtual output queue length recorder 410. The queue length recorder 410 may be performed by the data memory state recorder 133. For each virtual output queue in a data memory, the virtual output queue length recorder 410 stores a length value indicating a number of data cells currently stored in a virtual output queue. The input scheduler 400 includes a credit state storage unit 420. For each crosspoint buffer corresponding to a virtual output queue, the credit state storage unit 420 stores a credit state. A plurality of circuits that perform an ANDing function receive outputs from the virtual output queue length recorder 410 and the credit state storage unit 420. The credit state is sent through a NOT function before it reaches the ANDing function. A largest queue first scheduler 440 receives the outputs of the circuits and selects a virtual output queue associated with the largest numerical output to transmit a data cell. The input scheduling unit 400 may also update credit states in the buffer state recorder 132 (shown in FIG. 1), manage the crosspoint states at the buffered crossbar fabric 131 (shown in FIG. 1), and update virtual output queue lengths in the data memory state recorder 133 (shown in FIG. 1) depending on the scheduling algorithm used by the output scheduler 136 (shown in FIG. 1).

By removing the NOT function between the credit state storage unit 420 and the circuits that perform the ANDing function, FIG. 4 may also illustrate an embodiment of an output scheduling unit 400 according to an embodiment of the present invention. The output scheduling unit 400 includes a virtual output queue length recorder 410. For each virtual output queue associated with an output port, the virtual output queue length recorder 410 stores a length number indicating a number of data cells currently stored in the virtual output queue. The output scheduler 400 includes a credit state storage unit 420. For each crosspoint buffer corresponding to the output port, the credit state storage unit 420 stores a credit state. A plurality of circuits that perform an ANDing function receive outputs from the virtual output queue length recorder 410 and the credit state storage unit 420. A largest queue first scheduler 440 receives the outputs of the circuits and selects a crosspoint buffer associated with a virtual output queue with the largest numerical output to transmit a cell into the output port. The output scheduling unit 400 may also update credit states in the buffer state recorder 132, manage the buffered crossbar fabric 131 for data cell transmission, and update virtual output queue lengths in the data memory state recorder 133 (shown in FIG. 1).

Figure 5:
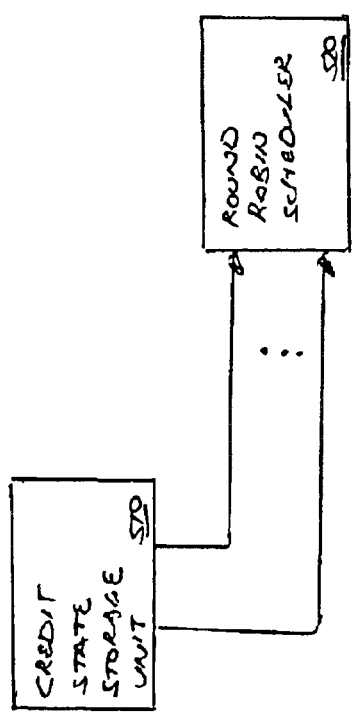
FIG. 5 illustrates an embodiment of the output scheduling unit which is part of the fabric scheduler shown in the network switch of FIG. 1.

FIG. 5 illustrates an embodiment of an output scheduling unit 500 according to an embodiment of the present invention. The output scheduler 500 includes a credit state storage unit 510. For each crosspoint buffer corresponding to an output port, the credit state storage unit 510 stores a credit state. The output scheduler 500 includes a round robin scheduler 520. The round robin scheduler 520 locates a crosspoint buffer having a credit state equal to 1 and schedules a data cell from that crosspoint to be transmitted onto the output port. The output scheduling unit 500 may also update credit states in the buffer state recorder 132 (shown in FIG. 1), manage the buffered crossbar fabric 131 for data cell transmission, and update virtual output queue lengths in the data memory state recorder 133 (shown in FIG. 1).

Figure 6:
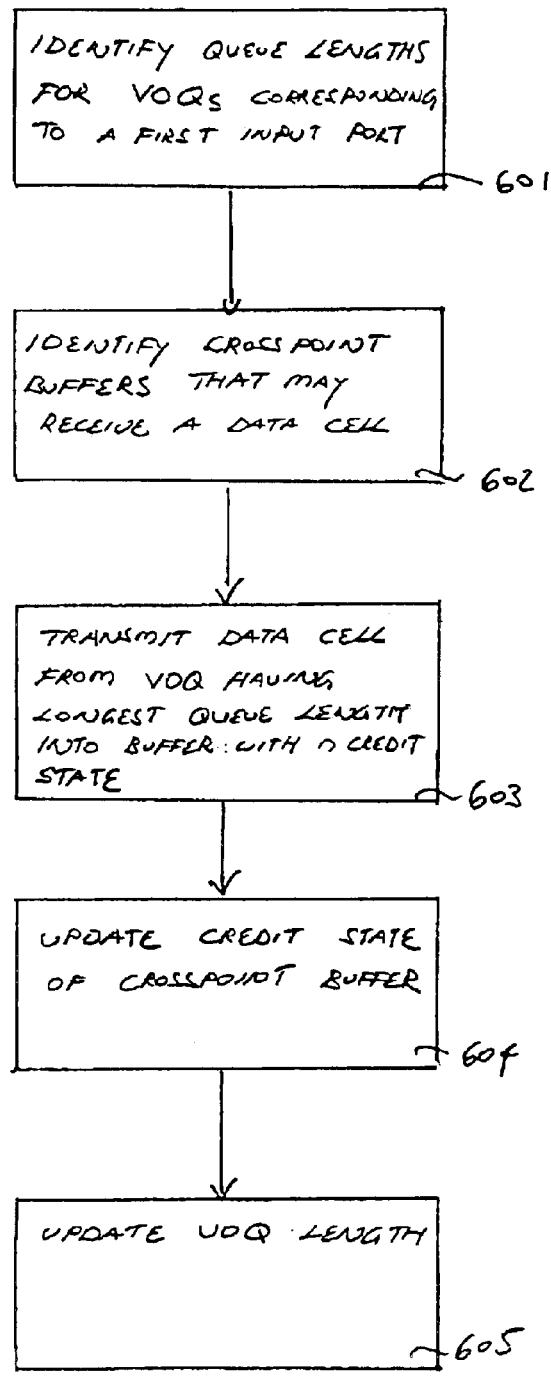
FIG. 6 is a flow chart illustrating a method of scheduling VOQs at an input port according to an embodiment of the present invention.

FIG. 6 is a flow chart illustrating a method of scheduling an input flow according to an embodiment of the present invention. At step 601, queue lengths for virtual output queues corresponding to a first input port are identified. According to an embodiment of the present invention, this is achieved by determining a number of data cells in a first virtual output queue corresponding to the first input port that stores data cells to be sent to a first output port, and determining a number of data cells in a second virtual output queue corresponding to the first input port that stores data cells to be sent to a second output port.

At step 602, buffers at crosspoints associated with the virtual output queues corresponding to the first input port that may receive a data cell are identified. According to an embodiment of the present invention, this is achieved by determining whether a first buffer at a crosspoint between the first input port and the first output port may be occupied, and determining whether a second buffer at a crosspoint between the first input port and the second output port may be occupied.

At step 603, a data cell from a virtual output queue corresponding to the first input port with a relatively longest queue length and that is associated with a crosspoint having a buffer that may receive the data cell is transmitted. According to an embodiment of the present invention, a data cell from the virtual output queue corresponding to the first input port with a relatively longest queue length may be selected by the flow scheduler, 113, for transmission based upon its priority status, the time it has been in the virtual output queue or other criteria.

At step 604, a credit state of the crosspoint is updated to reflect that the data cell is occupying it.

At step 605, the number of data cells in the virtual output queue with the longest queue length is updated to reflect that a data cell has been transmitted from the virtual output queue.

Figure 7:
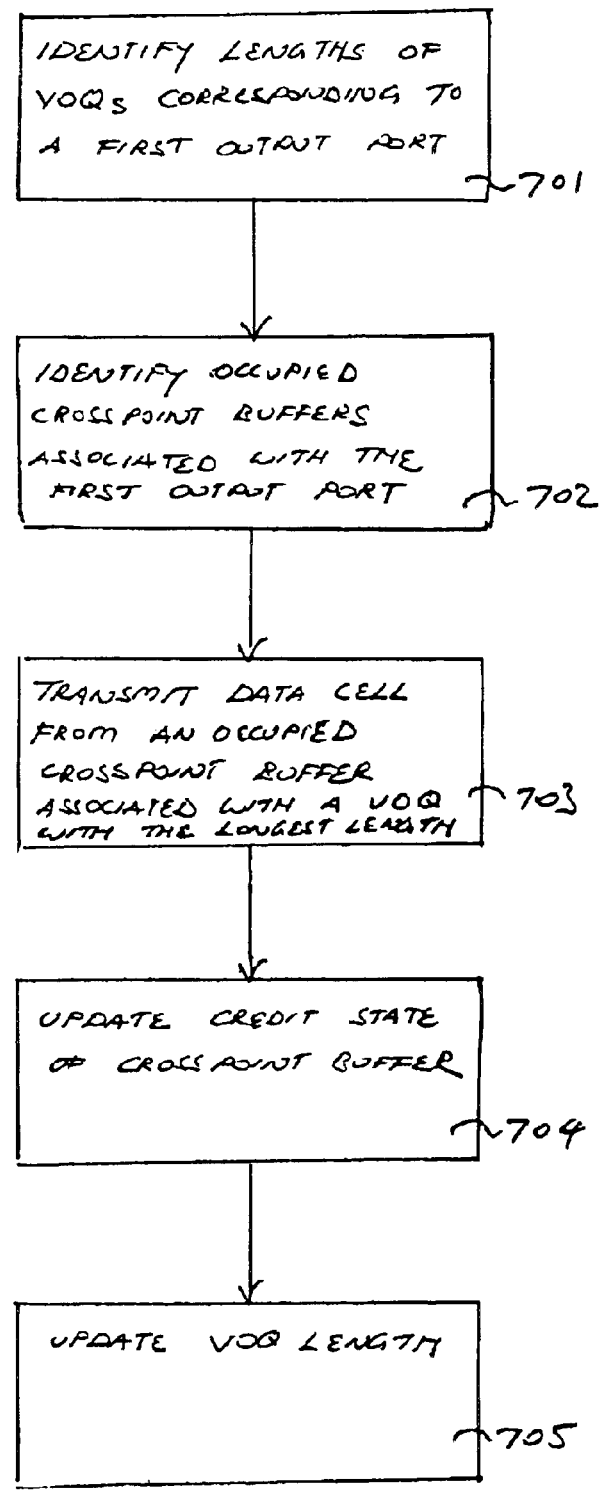
FIG. 7 is a flow chart illustrating a first method of scheduling VOQs at an output port to an embodiment of the present invention.

FIG. 7 is a flow chart illustrating a first method of scheduling an output flow according to an embodiment of the present invention. At step 701, queue lengths for virtual output queues corresponding to a first output port are identified. According to an embodiment of the present invention, this is achieved by determining a number of data cells in a first virtual output queue corresponding to the first input port that stores data cells to be sent to a first output port, and determining a number of data cells in a second virtual output queue corresponding to the second input port that stores data cells to be sent to the first output port.

At step 702, buffers at crosspoints associated with the virtual output queues corresponding to the first output port that are occupied are identified. According to an embodiment of the present invention, this is achieved by determining whether a first buffer at a crosspoint between the first input port and the first output port is storing a data cell, and determining whether a second buffer at a crosspoint between the second input port and the first output port is storing a data cell.

At step 703, a data cell from an occupied buffer at a crosspoint associated with a virtual output queue corresponding to the first output port and having a relatively longest queue length is transmitted.

At step 704, a credit state of the crosspoint is updated to reflect that the data cell has been transmitted from it.

At step 705, the number of data cells in the virtual output queue corresponding to the first output port with the longest queue length is updated to reflect that a data cell has been transmitted from the virtual output queue.

Figure 8:
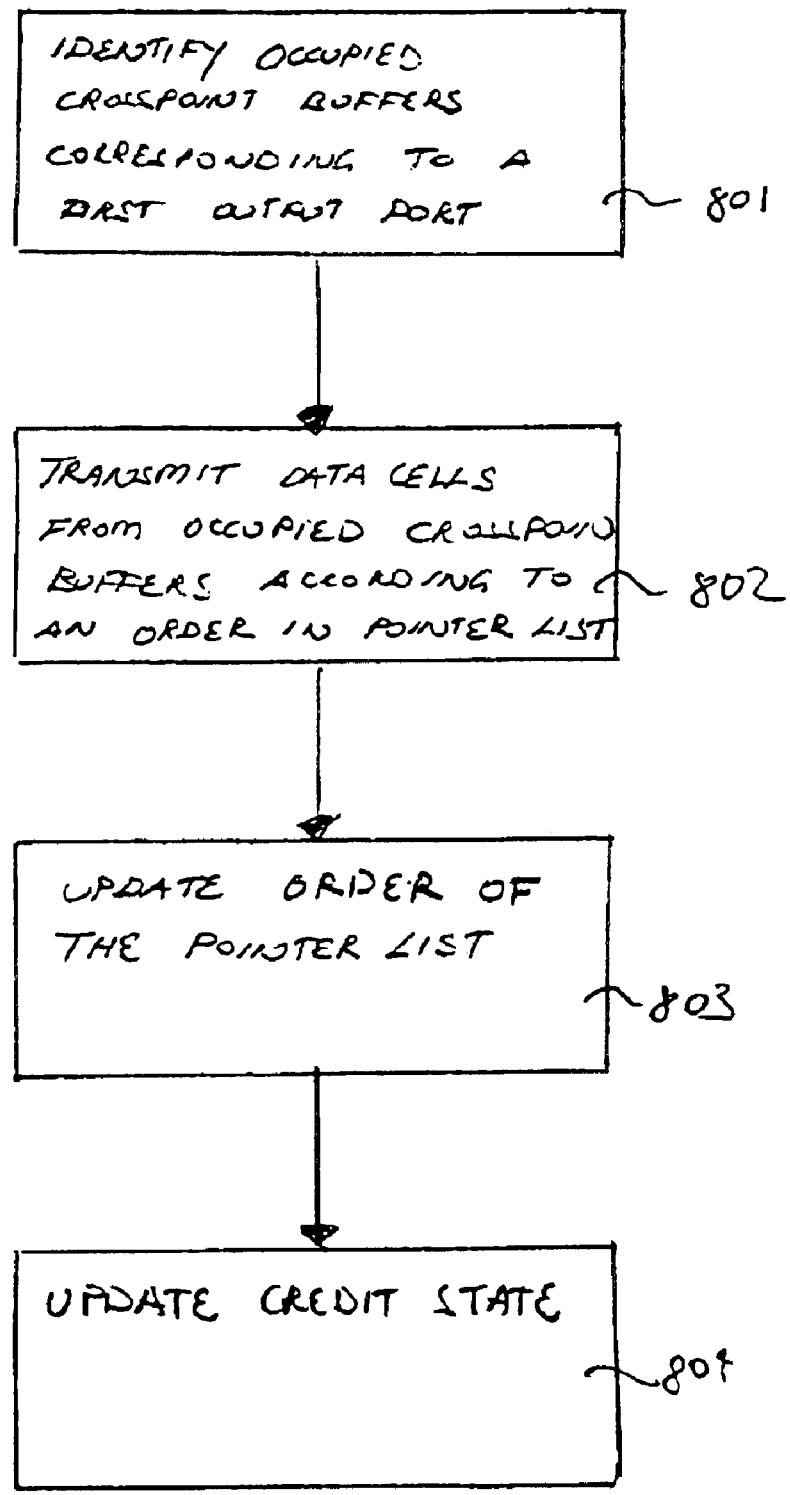
FIG. 8 is a flow chart illustrating a second method of scheduling VOQs at an output port according to an embodiment of the present invention.

FIG. 8 is a flow chart illustrating a second method of scheduling an output flow according to an embodiment of the present invention.

At step 801, buffers at crosspoints associate with the virtual output queues corresponding to a first output port that are occupied are identified. The crosspoints are identified in an order on a pointer location list in a round robin scheme. According to an embodiment of the present invention, this is achieved by determining whether a first buffer at a crosspoint between the first input port and the first output port is storing a data cell, and determining whether a second buffer at a crosspoint between the second input port and the first output port is storing a data cell.

At step 802, a data cell from a buffer at a crosspoint associated with a virtual output queue corresponding to the first output port is transmitted according to an order in the pointer location list.

At step 803, the order of the pointer list is updated.

At step 804, a credit state of the crosspoint is updated to reflect that the data cell has been transmitted from it.

FIGS. 6–8 are flow charts describing methods for scheduling input and output flows according to embodiments of the present invention. Some of the steps illustrated may be performed sequentially or in an order other than that which is described. It should be appreciated that not all of the steps described may be required, that additional steps may be added, and that some of the illustrated steps may be substituted with other steps. For example, if the method described in flow chart 6 is to be practiced in conjunction with the method described in flow chart 7, step 605 could be omitted.

Figure 9:
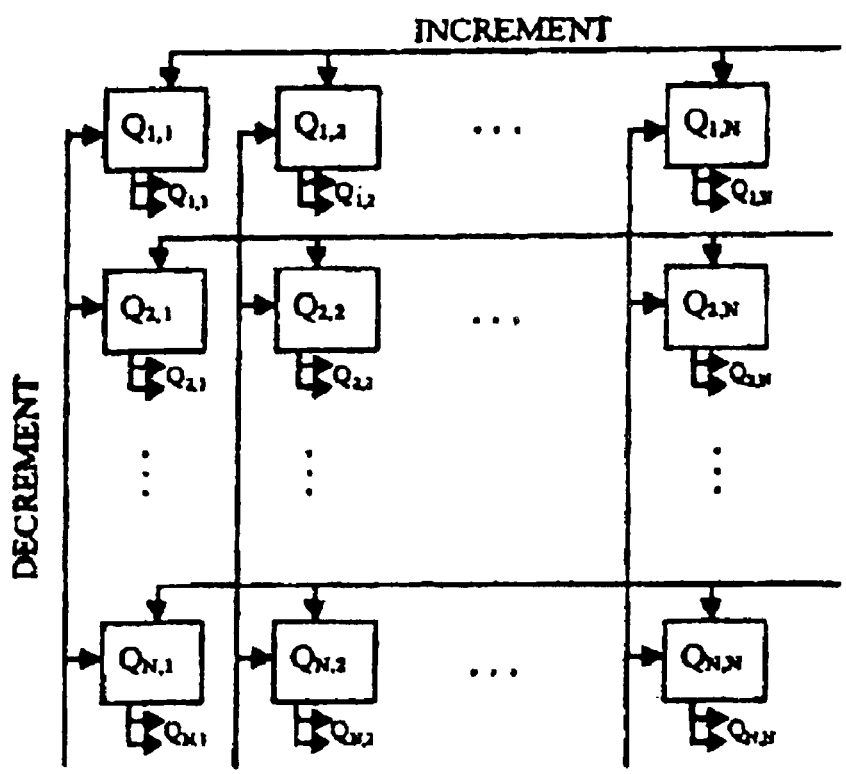
FIG. 9 is a block diagram illustrating a $Q_{i,j}$ block according to an embodiment of the present invention.
Figure 10:
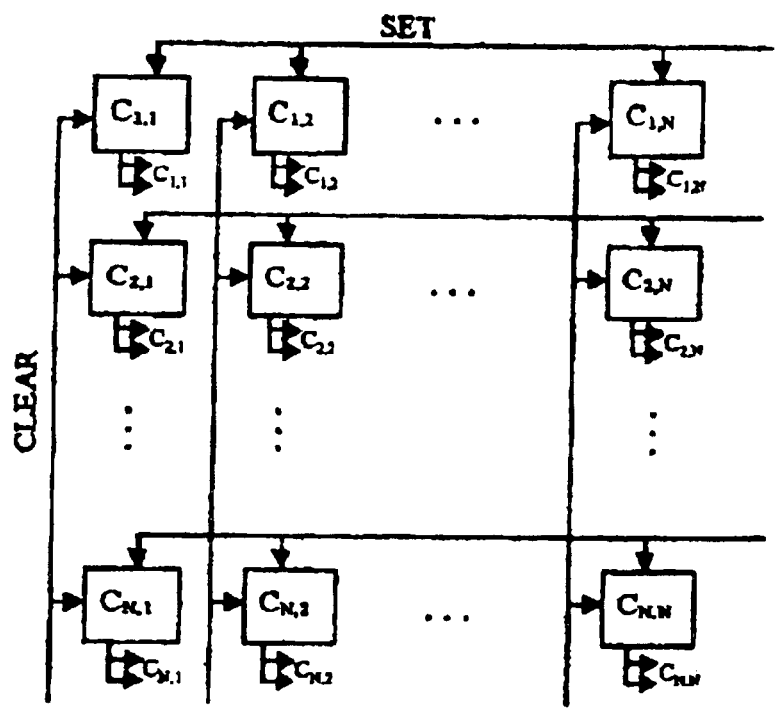
FIG. 10 is a block diagram illustrating the $C_{i,j}$ block according to an embodiment of the present invention.
Figure 11:
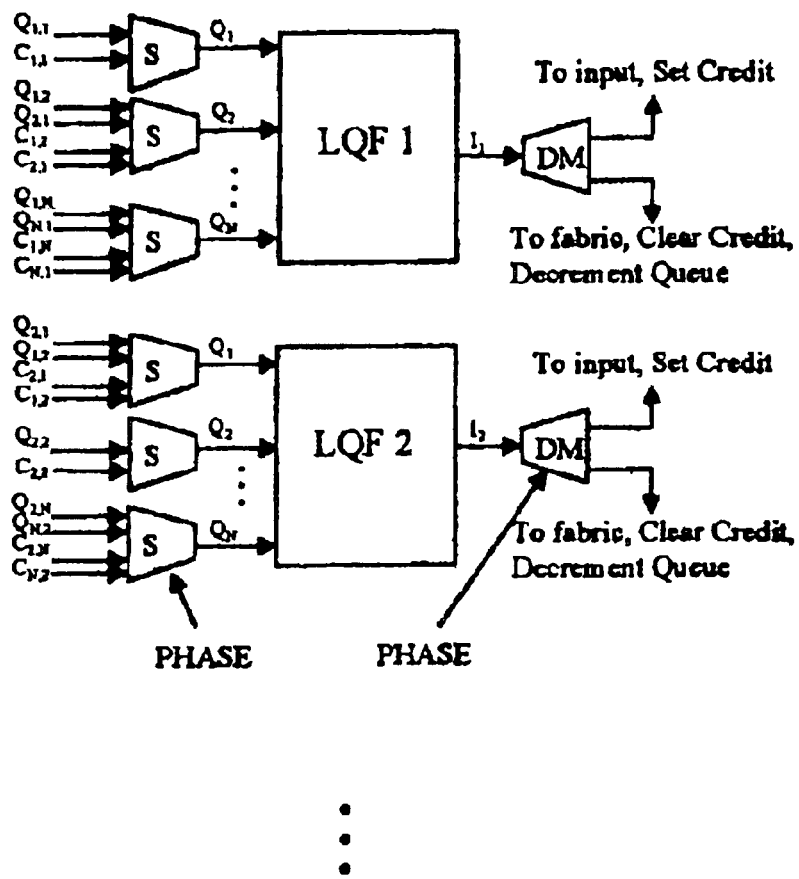
FIG. 11 is a block diagram illustrating the signals sent to the largest queue first scheduling blocks.
Figure 11:
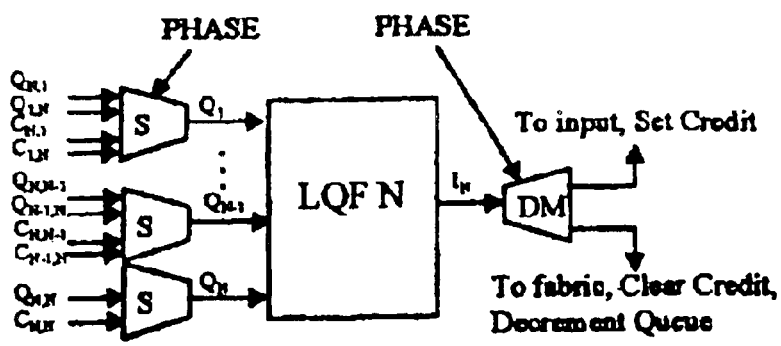

For a fabric scheduler 134 (shown in FIG. 1) that implements an input scheduler 135 and an output scheduler 136 using a largest queue first scheduling algorithm, the virtual output queues (VOQ) lengths and credit states for a particular input/output pair may be used by one input scheduling unit and one output scheduling unit. If all the input and output largest queue first scheduling units are implemented in a central location such as the switching center 130 (shown in FIG. 1), these scheduling units may jointly access the buffer state information. Since the largest queue first schedulers for the input and output scheduling phases may be similar in operation, and since the output scheduling phase must be completed before the input scheduling phase begins, one largest queue first scheduler can perform both the input and output scheduling. FIGS. 9–11 illustrate an architecture where a bank of N largest queue first schedulers are fed by signals from the credit state $C_{i,j}$ blocks, and from the virtual output queue state, $Q_{i,j}$ blocks, memory. The largest queue first scheduler number m is dedicated to input m and to output m.

FIG. 9 illustrates a $Q_{i,j}$ block that stores and updates the queue length of virtual output queues VOQi,j. Thus, row i of the $Q_{i,j}$ blocks corresponds to VOQ lengths for input i, and column j of the $Q_{i,j}$ blocks represents VOQ lengths for output j.

FIG. 10 illustrates the $C_{i,j}$ blocks that store and updates the credit state for crosspoint (i,j). Row i of the $C_{i,j}$ blocks corresponds to the crosspoint credit states for input i, and column j of the $C_{i,j}$ blocks represents the crosspoint credit states for output j.

FIG. 11 illustrates the value of the counter in the $Q_{i,j}$ block, signal $Q_{i,j}$, and the credit in the $C_{i,j}$ block, signal $C_{i,j}$ sent to the appropriate S block that precedes the ith and the jth largest queue first scheduling blocks.

Figure 12:
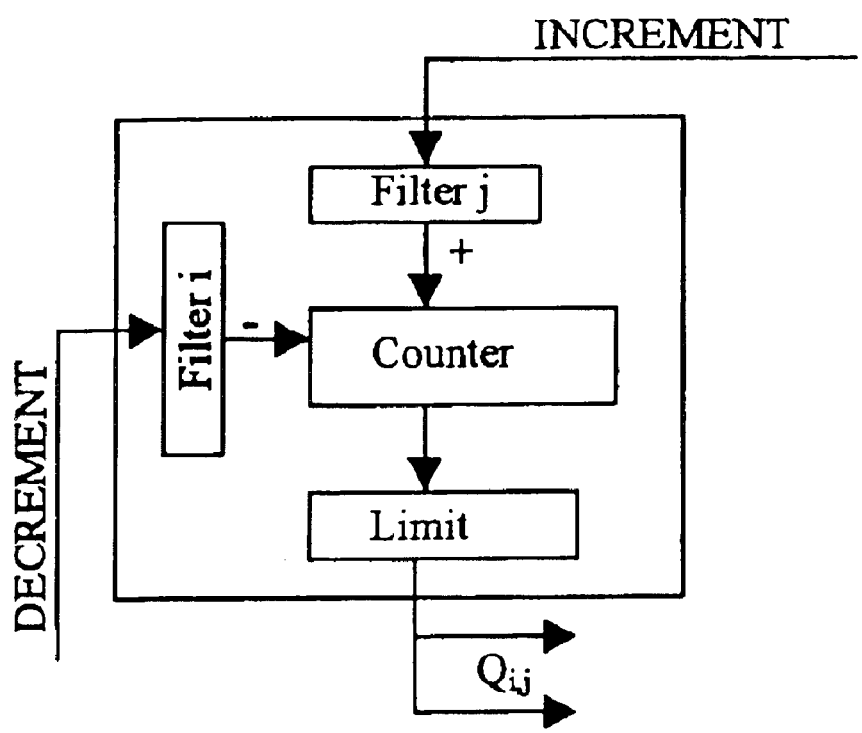
FIG. 12 illustrates a functional block diagram of the $Q_{i,j}$ block.

FIG. 12 illustrates the function of a $Q_{i,j}$ block. The index on the INCREMENT is filtered to see if it matches output j. The counter is incremented for a match. The index on the DECREMENT line is filtered to see if it matches input i. The counter is decremented for a match. The $Q_{i,j}$ counter value sent to the S blocks is limited to some maximum value to ease implementation. According to an embodiment of the present invention, the $C_{i,j}$ block is similar to FIG. 12 with the exception of having the Counter and Limit blocks replaced by a 1 bit register.

Figure 13:
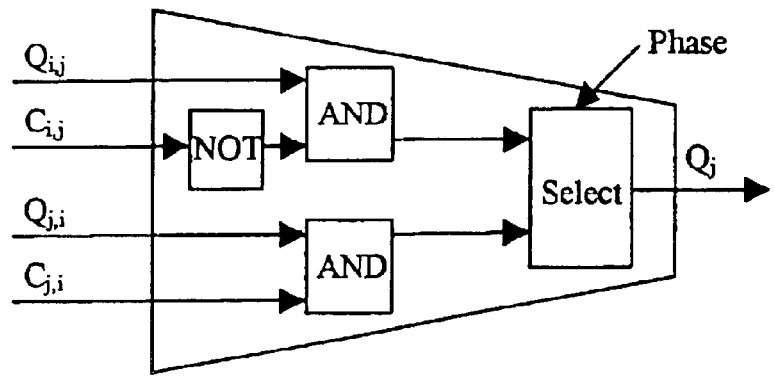
FIG. 13 illustrates an embodiment of the S block shown in FIG. 11.

FIG. 13 illustrates an embodiment of the S block as shown in FIG. 11. The S block has three functions. First it selects the appropriate $Q_{i,j}$ and $C_{i,j}$ signals depending on the current phase (input and output scheduling). Second, it inverts the chosen $C_{i,j}$ signal in the input phase. The third function is to AND the $Q_{i,j}$ signal with the $C_{i,j}$ signal as shown in FIG. 4. A more detailed block diagram of S block number j for the largest queue first scheduler i is showing FIG. 13. If the phase signal indicates input scheduling, the inverted $C_{i,j}$ signal ANDed with each bit of the $Q_{i,j}$ signal is selected as the $Q_j$ signal sent to the LQF scheduler i. If the phase signal indicates output scheduling, the $C_{j,i}$ signal ANDed with each bit of the $Q_{j,i}$ signal is selected as the Qj signal. Note that when i=j only two signals enter the S block, namely, $Q_{i,i}$ and $C_{i,i}$. Thus, when i=j the $Q_{i,i}$ and $C_{i,i}$ signals are split to both the upper and lower parts of FIG. 13. With a modification to the S block, namely, the S block receives multiple $Q_{i,j}$ and $C_{i,j}$ signals, and receives multiple $Q_{j,i}$ and $C_{j,i}$ signals, one LQF scheduler may be used for multiple input and output schedulers. For example, if one LQF scheduler could perform the functions of LQF 1 and LQF 2 in FIG. 11. The input and output scheduler phases have two halves to them. In the first half of the input scheduling phase, the LQF scheduler decides among the VOQs for input port 1, and in the second half the LQF scheduler decides among the VOQs for input port 2. The output scheduling phase also has two halves also. In the first half the LQF scheduler decides among the VOQs for output port 1, and in the second half the LQF scheduler decides among the VOQs for output port 2. The S block in FIG. 13 now needs two $Q_{i,j}$ and $C_{i,j}$ signals and two $Q_{j,i}$ and $C_{j,i}$ signals. One set for both input and output scheduling has i=1 and the other set has i=2. It also needs another signal besides the phase signal to indicate what half the scheduling is in for a particular phase. The select function now selects between four possible signals.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A data routing mechanism, comprising:
   virtual output queues (VOQs) corresponding to a first input port that store data to be sent to one of a first and second output port;
   VOQs corresponding to a second input port that store data to be sent to one of the first and second output port;
   a switch fabric that includes a plurality of buffers at crosspoints between the first and second input ports and the first and second output ports;
   a first input scheduler that transmits a first data from the VOQs corresponding to the first input port to one of the plurality of buffers based on lengths of the VOQs corresponding to the first input port and a credit state of the plurality of buffers.

2. The data routing mechanism of claim 1, further comprising:
   a second input scheduler that transmits a second data from the VOQs corresponding to the second input port to one of the plurality of buffers based on lengths of the VOQs corresponding to the second input port and the credit state of the plurality of buffers.

3. The data routing mechanism of claim 1, further comprising:
   a first output scheduler that transmits a second data from the plurality of buffers to the first output port based on a round robin scheduling scheme and the credit state of the plurality of buffers.

4. The data routing mechanism of claim 3, further comprising
   a second output scheduler that transmits a third data from the plurality of buffers to the second output port based on the round robin scheduling scheme and the credit state of the plurality of buffers.

5. The data routing mechanism of claim 1, further comprising:
   a first output scheduler that transmits a second data from the plurality of buffers to the first output port based on the lengths of the VOQs associated with the first output port and the credit state of the plurality of buffers.

6. The data routing mechanism of claim 5, further comprising
   a second output scheduler that transmits a third data from the plurality of buffers to the second output port based on the lengths of the VOQs associated with the second output port and the credit state of the plurality of buffers.

7. A data routing mechanism, comprising:
   a first virtual output queue (VOQ) corresponding to a first input port that stores a cell to be sent to a first output port;
   a second VOQ corresponding to the first input port that stores a cell to be sent to a second output port;
   a first VOQ corresponding to a second input port that stores a cell to be sent to the first output port;
   a second VOQ corresponding to the second input port that stores a cell to be sent to the second output port;
   a first buffer at a crosspoint between the first input port and the first output port;
   a second buffer at a crosspoint between the first input port and the second output port;
   a third buffer at a crosspoint between the second input port and the first output port;
   a fourth buffer at a crosspoint between the second input port and the second output port;
   a first input scheduler that transmits the cell in one of the first and second VOQs corresponding to the first input port to one of the first and second buffers based on lengths of the first and second VOQs corresponding to the first input port and whether the first and second buffers may receive the first data.

8. The data routing mechanism of claim 7, further comprising:
   a second input scheduler that transmits the cell in one of the first and second VOQs corresponding to the second input port to one of the third and fourth buffers based on lengths of the first and second VOQs corresponding to the second input port and whether the third and fourth buffers may receive the second data.

9. The switch fabric of claim 7, further comprising:
   a first output scheduler that transmits a cell in one of the first and third buffers to the first output port based on a round robin scheduling scheme and whether the first and third buffers are occupied.

10. The switch fabric of claim 9, further comprising:
    a second output scheduler that transmits a cell in one of the second and fourth buffers to the second output port based on the round robin scheduling scheme and whether the second and fourth buffers are occupied.

11. The switch fabric of claim 7, further comprising:
    a first output scheduler that transmits a cell in one of the first and third buffers to the first output port based on the lengths of the first VOQs corresponding to the first and second input ports and whether the first and third buffers are occupied.

12. The switch fabric of claim 11, further comprising:

a second output scheduler that transmits a cell in one of the second and fourth buffers to the second output port based on the lengths of the second VOQs corresponding to the first and second input ports and whether the second and fourth buffers are occupied.

13. A method for managing traffic in a switch fabric, comprising:

identifying queue lengths for virtual output queues (VOQs) corresponding to a first input port;

identifying buffers at crosspoints associate with the VOQs corresponding to the first input port that may receive a data cell; and transmitting a data cell from a VOQ corresponding to the first input port with a relatively longest queue length and that is associated with a crosspoint having a buffer that may receive the data cell.

14. The method of claim 13, wherein identifying the queue lengths for the VOQs corresponding to the first input port comprises:

determining a number of data cells in a first VOQ corresponding to the first input port that stores data cells to be sent to a first output port; and determining a number of data cells in a second VOQ corresponding to the first input port that stores data cells to be sent to a second output port.

15. The method of claim 13, wherein identifying the buffers at the crosspoints associated with the VOQs corresponding to the first input port that may receive the data cell comprises:

determining whether a first buffer at a crosspoint between the first input port and the first output port may be occupied; and determining whether a second buffer at a crosspoint between the first input port and the second output port may be occupied.

16. The method of claim 13, further comprising:

identifying queue lengths for virtual output queues (VOQs) corresponding to a second input port;

identifying buffers at crosspoints associate with the VOQs corresponding to the second input port that may receive the data cell; and transmitting a data cell in a VOQ corresponding to the second input port with a relatively longest queue length and that is associated with a crosspoint having a buffer that may receive the data cell.

17. The method of claim 16, further comprising:

identifying buffers corresponding to crosspoints of a first output port that are occupied; and transmitting cells from the buffers corresponding to the crosspoints of the first output port that are occupied to the first output port based on a round robin scheduling scheme.

18. The method of claim 17, further comprising:

identifying buffers corresponding to crosspoints of a second output port that are occupied; and transmitting cells from the buffers corresponding to the crosspoints of the second output port that are occupied to the second output port based on the round robin scheduling scheme.

19. The method of claim 16, further comprising:

identifying buffers corresponding to crosspoints of a first output port that are occupied; and transmitting cells from the buffers corresponding to the crosspoints of the first output port that are occupied to the first output port based on the queue lengths of the VOQs corresponding to the first and second input ports.

20. The method of claim 17, further comprising:

identifying buffers corresponding to crosspoints of a second output port that are occupied; and transmitting cells from the buffers corresponding to the crosspoints of the second output port that are occupied to the second output port based on the queue lengths of the VOQs corresponding to the first and second input ports.

* * * * *